(12) United States Patent
He et al.

(10) Patent No.: US 11,688,882 B2
(45) Date of Patent: Jun. 27, 2023

(54) ELECTROLYTES AND SEPARATORS FOR LITHIUM METAL BATTERIES

(71) Applicant: GM GLOBAL TECHNOLOGY OPERATIONS LLC, Detroit, MI (US)

(72) Inventors: Meinan He, Madison Heights, MI (US); Mei Cai, Bloomfield Hills, MI (US); Biqiong Wang, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 232 days.

(21) Appl. No.: 17/085,744

(22) Filed: Oct. 30, 2020

(65) Prior Publication Data

US 2022/0140394 A1    May 5, 2022

(51) Int. Cl.
*H01M 10/0568* (2010.01)
*H01M 10/0569* (2010.01)
(Continued)

(52) U.S. Cl.
CPC ....... *H01M 10/0568* (2013.01); *H01M 4/366* (2013.01); *H01M 4/382* (2013.01);
(Continued)

(58) Field of Classification Search
CPC ........ H01M 4/366; H01M 4/382; H01M 4/62; H01M 10/052; H01M 10/0568;
(Continued)

(56) References Cited

U.S. PATENT DOCUMENTS 8,974,946 B2    3/2015 Cai et al.
9,123,939 B2    9/2015 Xiao et al.
(Continued)

FOREIGN PATENT DOCUMENTS

| CN | 114447437 A | 5/2022 |
|---|---|---|
| DE | 102021113933 A1 | 5/2022 |
| WO | 2017045573 A1 | 3/2017 |

OTHER PUBLICATIONS

Yersak, Thomas A. et al., U.S. Appl. No. 16/438,590, filed Jun. 12, 2019 entitled, "Protective Sacrificial Coating to Enhance Stability of Battery Materials," 31 pages.
(Continued)

*Primary Examiner* — Ula C Ruddock
(74) *Attorney, Agent, or Firm* — Harness, Dickey & Pierce, P.L.C.

(57) ABSTRACT

The present disclosure relates to electrolyte systems and/or separators for electrochemical cells that cycle lithium ions and which may have lithium metal electrodes. The electrochemical cell includes a liquid electrolyte system that fills voids and pores within the electrochemical cell. The electrolyte system includes two or more lithium salts and two or more solvents. The two or more lithium salts include bis(fluorosulfonyl)imide ($LiN(FSO_2)_2$) (LIFSI) and lithium perchlorate ($LiClO_4$). The two or more solvents include a first solvent and a second solvent. The first solvent may be a fluorinated cyclic carbonate. The second solvent may be a linear carbonate. A volumetric ratio of the first solvent to the second solvent may be 1:4. The electrochemical cell may include a surface-modified separator that has one or more coatings or fillers.

17 Claims, 4 Drawing Sheets

(51) Int. Cl.
*H01M 10/052* (2010.01)
*H01M 50/411* (2021.01)
*H01M 50/431* (2021.01)
*H01M 50/449* (2021.01)
*H01M 4/38* (2006.01)
*H01M 4/36* (2006.01)
*H01M 4/62* (2006.01)
*H01M 4/02* (2006.01)

(52) U.S. Cl.
CPC .......... *H01M 4/62* (2013.01); *H01M 10/052* (2013.01); *H01M 10/0569* (2013.01); *H01M 50/411* (2021.01); *H01M 50/431* (2021.01); *H01M 50/449* (2021.01); *H01M 2004/027* (2013.01); *H01M 2300/0034* (2013.01); *H01M 2300/0037* (2013.01)

(58) Field of Classification Search
CPC .......... H01M 10/0569; H01M 50/411; H01M 50/431; H01M 50/449; H01M 2004/027; H01M 2300/0034; H01M 2300/0037
See application file for complete search history.

(56) References Cited

U.S. PATENT DOCUMENTS

| | | |
|---|---|---|
| 9,160,036 B2 | 10/2015 | Yang et al. |
| 9,252,411 B2 | 2/2016 | Abd Elhamid et al. |
| 9,302,914 B2 | 4/2016 | Liu et al. |
| 9,362,552 B2 | 6/2016 | Sohn et al. |
| 9,373,829 B2 | 6/2016 | Xiao et al. |
| 9,437,871 B2 | 9/2016 | Zhou et al. |
| 9,537,144 B2 | 1/2017 | Huang et al. |
| 9,742,028 B2 | 8/2017 | Zhou et al. |
| 9,896,763 B2 | 2/2018 | Dadheech et al. |
| 9,905,847 B2 | 2/2018 | Dadheech et al. |
| 9,923,189 B2 | 3/2018 | Xiao |
| 9,929,435 B2 | 3/2018 | Cai et al. |
| 9,979,008 B2 | 5/2018 | Dai et al. |
| 9,985,284 B2 | 5/2018 | Dadheech et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,312,501 B2 | 6/2019 | Yang et al. |
| 10,326,166 B2 | 6/2019 | Yang et al. |
| 10,367,201 B2 | 7/2019 | Yang et al. |
| 10,381,170 B2 | 8/2019 | Dai et al. |
| 10,396,360 B2 | 8/2019 | Xiao et al. |
| 10,431,849 B2 | 10/2019 | Yersak et al. |
| 10,573,879 B2 | 2/2020 | Yang et al. |
| 10,622,627 B2 | 4/2020 | Dadheech et al. |
| 10,629,941 B2 | 4/2020 | Dai et al. |
| 10,629,949 B2 | 4/2020 | Yersak et al. |
| 10,680,281 B2 | 6/2020 | Yersak et al. |
| 10,734,673 B2 | 8/2020 | Yersak et al. |
| 11,094,996 B2 | 8/2021 | Xiao et al. |
| 11,404,698 B2 | 8/2022 | Xu et al. |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2016/0111721 A1 | 4/2016 | Xiao et al. |
| 2016/0172706 A1 | 6/2016 | Xiao et al. |
| 2016/0172710 A1 | 6/2016 | Liu et al. |
| 2017/0271678 A1 | 9/2017 | Yang et al. |
| 2018/0309169 A1* | 10/2018 | Yang ............... H01M 10/0525 |
| 2019/0027724 A1* | 1/2019 | Xing ............... H01M 10/0562 |
| 2019/0319242 A1 | 10/2019 | Dadheech ......... H01M 50/434 |
| 2019/0326579 A1* | 10/2019 | Ryu ................. H01M 50/449 |
| 2019/0341615 A1 | 11/2019 | Xiao et al. |
| 2019/0372155 A1 | 12/2019 | Yersak et al. |
| 2019/0393549 A1 | 12/2019 | Yersak et al. |
| 2020/0052338 A1 | 2/2020 | Liu et al. |
| 2020/0127282 A1 | 4/2020 | Yersak et al. |
| 2020/0152986 A1* | 5/2020 | Lee .................. H01M 4/134 |
| 2020/0381768 A1* | 12/2020 | Abdul Jabbar ....... H01M 4/525 |
| 2020/0395630 A1 | 12/2020 | Yersak et al. |

OTHER PUBLICATIONS

Xiao, Xingcheng et al., U.S. Appl. No. 16/575,143, filed Sep. 18, 2019 entitled, "Additive to Ceramic Ion Conducting Material to Mitigate the Resistive Effect of Surface Carbonates and Hydroxides," 51 pages.

Xu, Jiagang et al., U.S. Appl. No. 16/668,904, filed Oct. 30, 2019 entitled, "Liquid Metal Interfacial Layers for Solid Electrolytes and Methods Thereof," 44 pages.

* cited by examiner

ELECTROLYTES AND SEPARATORS FOR LITHIUM METAL BATTERIES

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator and/or electrolyte may be disposed between the negative and positive electrodes. The electrolyte is suitable for conducting lithium ions between the electrodes and, like the two electrodes, may be in solid and/or liquid form and/or a hybrid thereof.

Many different materials may be used to create components for a lithium ion battery. For example, positive electrode materials for lithium batteries typically comprise an electroactive material which can be intercalated with lithium ions, such as lithium-transition metal oxides or mixed oxides, for example including $LiMn_2O_4$, $LiCoO_2$, $LiNiO_2$, $LiMn_{1.5}Ni_{0.5}O_4$, $LiNi_{(1-x-y)}Co_xM_yO_2$ (where $0<x<1$, $y<1$, and M may be Al, Mn, or the like), or one or more phosphate compounds, for example including lithium iron phosphate or mixed lithium manganese-iron phosphate. The negative electrode typically includes a lithium insertion material or an alloy host material. For example, typical electroactive materials for forming an anode include, lithium (for example, lithium metal), graphite and other forms of carbon, silicon and silicon oxide, tin and tin alloys.

Liquid electrolytes may include one or more lithium salts dissolved in an organic solvent or a mixture of organic solvents. Certain electrolytes have particular advantages. For example, electrolytes including high concentrations (e.g., about 4M) of a lithium bis(fluorosulfonyl)imide (LiN(FSO$_2$)$_2$) (LIFSI) may have good cyclability (e.g., at c/10 about 200 cycles) and a long shelf life, as well as a reduced flash point and improved safety. However, such electrolytes are often costly and may have comparatively low conductivities (e.g., about 2 s/cm) and reduced wettabilities. Other electrolytes include, for example, localized lithium bis(fluorosulfonyl)imide (LiN(FSO$_2$)$_2$) (LIFSI) with 1,2-dimethoxyethane (DME) and/or bis(2,2,2-trifluoroethyl)ether and/or fluorinated ether co-solvent (such as, bis(2,2,2-trifluoroethyl) ether or 1,1,2,2-tetrafluoroethyl-2,2,3,3-tetrafluoropropyl ether). Such electrolytes may have an improved conductivities (e.g. about 4 s/cm) and good wettability. Such electrolytes may also have improved cyclability (e.g., at c/10 about 350 cycles and at c/3 about 150 cycles). However, such electrolytes are often costly and may have a comparatively short shelf life. Moreover, in certain instances, the introduction of fluorinated ether co-solvents may reduce the electrolyte flash point so as to cause thermostability issue. Still other electrolytes include, for example, lithium hexafluorophosphate (LiPF$_6$) (e.g., about 1M-2M) with fluoroethylene carbonate (FEC) and ethylmethylcarbonate (EMC). Such electrolytes may have improved conductivities (e.g., about 7.5 s/cm) and good wettability, as well as a reduced cost and long shelf life. However, such electrolytes may have limited capacity retention (e.g., at c/10 about 120 cycles and at c/3 about 50 cycles). Accordingly, it would be desirable to develop battery materials, like electrolytes, that provide high performance at lower cost.

SUMMARY

This section provides a general summary of the disclosure, and is not a comprehensive disclosure of its full scope or all of its features.

The present disclosure relates to electrolyte systems and/or separators for electrochemical cells that cycle lithium ions and that have, for example, lithium metal electrodes, and to electrochemical cells including such electrolyte systems and/or separators.

In various aspects, the present disclosure provides an electrochemical cell that cycles lithium ions. The electrochemical cell includes a liquid electrolyte system that fills voids and pores within the electrochemical cell. The electrolyte system includes two or more lithium salts and two or more solvents. The two or more lithium salts include greater than or equal to about 0.1M to less than or equal to about 0.9M of a first lithium salt and greater than or equal to about 0.1M to less than or equal to about 0.9M of a second lithium salt. The first lithium salt may be lithium bis(fluorosulfonyl)imide (LiN(FSO$_2$)$_2$) (LIFSI). The second lithium salt may be lithium perchlorate (LiClO$_4$). The two or more solvents include a first solvent and a second solvent. The first solvent may be a fluorinated cyclic carbonate. The second solvent may be a linear carbonate. A volumetric ratio of the first solvent to the second solvent may be 1:4.

In one aspect, the two or more lithium salts may further include greater than or equal to about 0.1M to less than or equal to about 0.9M of a third lithium salt.

In one aspect, the third lithium salt may be selected from the group consisting of: lithium hexafluorophosphate (LiPF$_6$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium tetraphenylborate (LiB(C$_6$H$_5$)$_4$), lithium bis(oxalato)borate (LiB(C$_2$O$_4$)$_2$) (LiBOB), lithium difluoro(oxalato)borate (LiBF$_2$(C$_2$O$_4$)) (LiDFOB), lithium hexafluoroarsenate (LiAsF$_6$), lithium trifluoromethanesulfonate (LiCF$_3$SO$_3$), lithium bis(trifluoromethane)sulfonylimide (LiN(CF$_3$SO$_2$)$_2$), lithium 4,5-dicyano-2-trifluoromethyl-imidazolide (LiTDI), lithium bis(2-methyl-2-fluoromalonato)borate (LiBMFMB), lithium tetrakis (2,2,2-trifluoroethoxy)borate (LiTTFB), lithium nonafluorobutanesulfonate (LiC$_4$F$_9$SO$_3$) (LiNFBS), lithium trifluoroacetate (Li[CF$_3$CO$_2$]), Li[C$_2$F$_5$CO$_2$], Li[PF$_2$(C$_2$O$_4$)$_2$], lithium tetrafluoro(oxalato)phosphate (Li[PF$_4$C$_2$O$_4$]), Li[N(FSO$_2$)$_2$], perfluoroalkyl sulfonyl lithium methide (Li[C(CF$_3$SO$_2$)$_3$]), Li[N(SO$_2$C$_2$F$_5$)$_2$], lithium alkyl fluorophosphates, Li[B(C$_2$O$_4$)$_2$], Li[BF$_2$C$_2$O$_4$], Li$_2$[B$_{12}$X$_{12-k}$H$_k$] (where X is OH, F, Cl, or Br; where $0 \le k \le 12$; and where $0 \le k' \le 10$), and combinations thereof.

In one aspect, the fluorinated cyclic carbonate may include fluoroethylene carbonate (FEC), and the linear carbonate may be selected from the group consisting of: dimethyl carbonate (DMC), diethyl carbonate (DEC), ethylmethylcarbonate (EMC), 1,2-dimethoxyethane (DME), and combinations thereof.

In one aspect, the electrochemical cell may further include a separator. The liquid electrolyte system may impregnate the separator. The separator may include one or more coatings.

In one aspect, the one or more coatings may be ultrathin coatings having a thickness greater than or equal to about 100 nm to less than or equal to about 10 μm.

In one aspect, the one or more coatings may include one or more ceramic coatings. The one or more ceramic coatings may include ceramic materials selected from the group consisting of: alumina, silica, phosphates, ceramic electrolytes, glassy electrolytes, and combinations thereof.

In one aspect, the one or more coatings may include one or more polymeric coating. The one or more polymeric coatings may include polymeric materials selected from the group consisting of: alucone, zirzone, poly(3,4-ethylenedioxythiophene) (PEDOT), metal organic framework (MOF) thin films, molecular layer deposited (MLD) polymer coatings, and combinations thereof.

In one aspect, the electrochemical cell may further include a separator. The liquid electrolyte system may impregnate the separator. The separator may include one or more fillers.

In one aspect, the one or more fillers may include one or more ceramic fillings. The one or more ceramic filings may include ceramic materials selected from the group consisting of: alumina, silica, titania, ceramic electrolytes, glassy electrolytes, and combinations thereof.

In one aspect, the electrochemical cell may further include a lithium metal electrode.

In one aspect, the liquid electrolyte system may include less than or equal to about 0.6M of lithium bis(fluorosulfonyl)imide $(LiN(FSO_2)_2)$ (LIFSI).

In one aspect, a solid electrolyte interface (SEI) layer may be formed on an exposed surface of the electrode.

In various aspects, the present disclosure provides another example electrochemical cell that cycles lithium ions. The electrochemical cell may include a positive electrode, a negative electrode that includes a lithium metal, a separator disposed between the positive electrode and the negative electrode, and a liquid electrolyte system that fills voids and pores within the positive electrode, the negative electrode, and the separator. The electrolyte system may include two or more lithium salts and two or more solvents. The two or more lithium salts may include greater than or equal to about 0.1M to less than or equal to about 0.9M of a first lithium salt and greater than or equal to about 0.1M to less than or equal to about 0.9M of a second lithium salt. The first lithium salt may be lithium bis(fluorosulfonyl)imide $(LiN(FSO_2)_2)$ (LIFSI). The second lithium salt may be lithium perchlorate $(LiClO_4)$. The two or more solvents may include a first solvent and a second solvent. The first solvent may be fluoroethylene carbonate (FEC). The second solvent may be selected from the group consisting of: dimethyl carbonate (DMC), diethyl carbonate (DEC), ethylmethylcarbonate (EMC), 1,2-dimethoxyethane (DME), and combinations thereof.

In one aspect, the two or more lithium salts may further include greater than or equal to about 0.1M to less than or equal to about 0.9M of a third lithium salt. The third lithium salt may be selected from the group consisting of: lithium hexafluorophosphate $(LiPF_6)$, lithium tetrachloroaluminate $(LiAlCl_4)$, lithium iodide (LiI), lithium bromide (LiBr), lithium thiocyanate (LiSCN), lithium tetrafluoroborate $(LiBF_4)$, lithium tetraphenylborate $(LiB(C_6H_5)_4)$, lithium bis(oxalato)borate $(LiB(C_2O_4)_2)$ (LiBOB), lithium difluoro (oxalato)borate $(LiBF_2(C_2O_4))$ (LiDFOB), lithium hexafluoroarsenate $(LiAsF_6)$, lithium trifluoromethanesulfonate $(LiCF_3SO_3)$, lithium bis(trifluoromethane)sulfonylimide $(LiN(CF_3SO_2)_2)$, lithium 4,5-dicyano-2-trifluoromethyl-imidazolide (LiTDI), lithium bis(2-methyl-2-fluoromalonato)borate (LiBMFMB), lithium tetrakis (2,2,2-trifluoroethoxy)borate (LiTTFB), lithium nonafluorobutanesulfonate $(LiC_4F_9SO_3)$ (LiNFBS), lithium trifluoroacetate $(Li[CF_3CO_2])$, $Li[C_2F_5CO_2]$, $Li[PF_2(C_2O_4)_2]$, lithium tetrafluoro(oxalato)phosphate $(Li[PF_4C_2O_4])$, $Li[N(FSO_2)_2]$, perfluoroalkyl sulfonyl lithium methide $(Li[C(CF_3SO_2)_3])$, $Li[N(SO_2C_2F_5)_2]$, lithium alkyl fluorophosphates, $Li[B(C_2O_4)_2]$, $Li[BF_2C_2O_4]$, $Li_2[B_{12}X_{12-k}H_k]$ (where X is OH, F, Cl, or Br; where $0 \le k \le 12$; and where $0 \le k' \le 10$), and combinations thereof.

In one aspect, the separator may include one or more coatings. The one or more coatings may be ultrathin coatings having a thickness greater than or equal to about 100 nm to less than or equal to about 10 µm.

In one aspect, the one or more coatings may include one or more ceramic coatings. The one or more ceramic coatings may include ceramic materials selected from the group consisting of: alumina, silica, phosphates, ceramic electrolytes, glassy electrolytes, and combinations thereof.

In one aspect, the one or more coatings may include one or more polymeric coating. The one or more polymeric coatings may include polymeric materials selected from the group consisting of: alucone, zirzone, poly(3,4-ethylenedioxythiophene) (PEDOT), metal organic framework (MOF) thin films, molecular layer deposited (MLD) polymer coatings, and combinations thereof.

In one aspect, the separator may include one or more fillers. The one or more fillers may include one or more ceramic fillings. The one or more ceramic filings may include ceramic materials selected from the group consisting of: alumina, silica, titania, ceramic electrolytes, glassy electrolytes, and combinations thereof.

In one aspect, a solid electrolyte interface (SEI) layer may be formed on an exposed surface of the electrode.

In various aspects, the present disclosure provides another example electrochemical cell that cycles lithium ions. The electrochemical cell may include a negative electrode include a lithium metal, a surface-modified separator including one or more ultrathin coatings, a solid electrolyte interface (SEI) layer disposed between the negative electrode and the surface-modified separator, and a liquid electrolyte system that fills voids and pores within the negative electrode, the separator, and the solid electrolyte interface (SEI) layer.

Each of the one or more ultrathin coatings may be ceramic coatings or polymeric coating. The electrolyte system includes two or more lithium salts and two or more solvents. The two or more lithium salts may include greater than or equal to about 0.1M to less than or equal to about 0.9M of a first lithium salt and greater than or equal to about 0.1M to less than or equal to about 0.9M of a second lithium salt. The first lithium salt may be lithium bis(fluorosulfonyl)imide $(LiN(FSO_2)_2)$ (LIFSI). The second lithium salt may be lithium perchlorate $(LiClO_4)$. The two or more solvents may include a first solvent and a second solvent. The first solvent may be fluoroethylene carbonate (FEC). The second solvent may be selected from the group consisting of: dimethyl carbonate (DMC), diethyl carbonate (DEC), ethylmethylcarbonate (EMC), 1,2-dimethoxyethane (DME), and combinations thereof.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

A typical lithium-ion battery (e.g., electrochemical cell that cycles lithium ions) includes a first electrode (such as, a positive electrode or cathode) opposing a second electrode (such as, a negative electrode or anode) and a separator and/or electrolyte disposed therebetween. Often, in a lithium-ion battery pack, batteries or cells may be electrically connected in a stack or winding configuration to increase overall output. Lithium-ion batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions (or sodium ions in the case of sodium-ion batteries, and the like) and may be in liquid, gel, or solid form. For example, exemplary and schematic illustration of an electrochemical cell (also referred to as a battery) 20 is shown in FIG. 1.

Such cells are used in vehicle or automotive transportation applications (e.g., motorcycles, boats, tractors, buses, motorcycles, mobile homes, campers, and tanks). However, the current technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples include a single cathode and a single anode, the skilled artisan will recognize that the current teaching extend to various other configurations, including those having one or more cathodes and one or more anodes, as well as various current collectors with electroactive layers disposed on or adjacent to one or more surfaces thereof.

Figure 1:
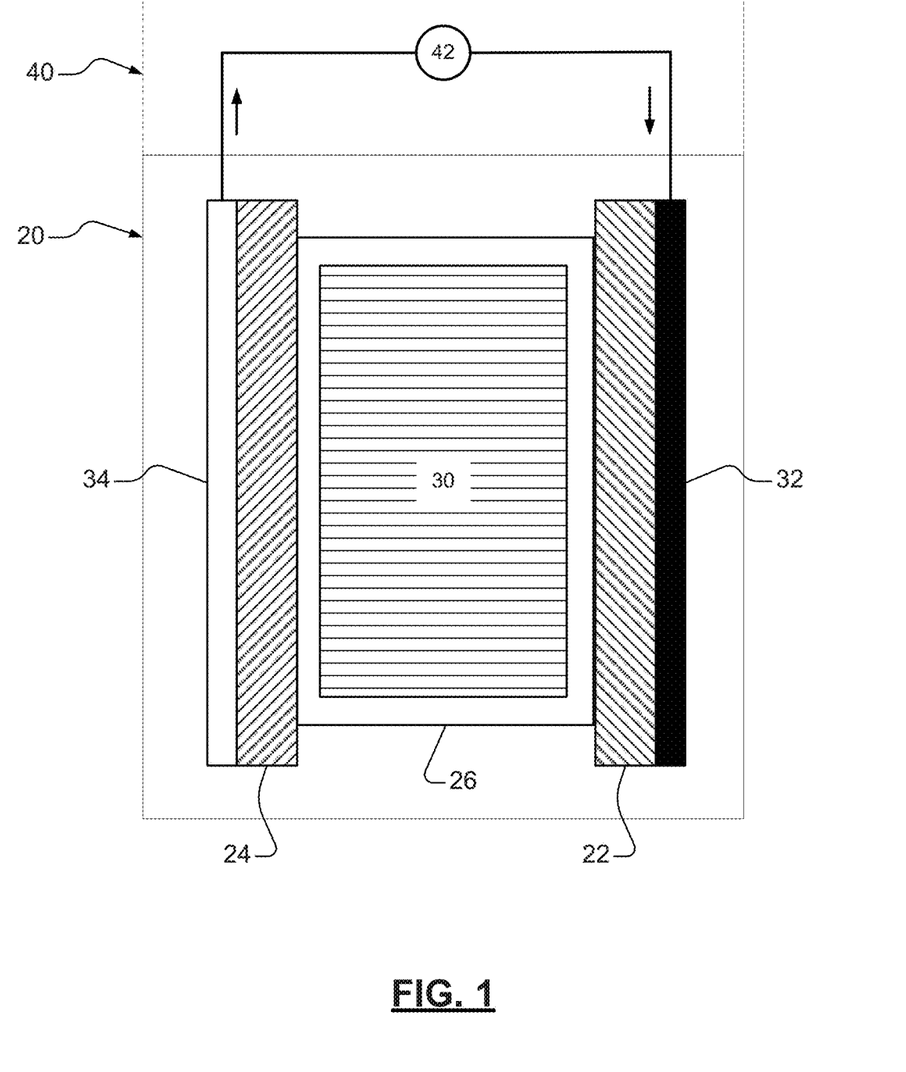
FIG. 1 is a schematic of an example electrochemical battery cell.

As illustrated in FIG. 1, the battery 20 includes a negative electrode 22 (e.g., anode), a positive electrode 24 (e.g., cathode), and a separator 26 disposed between the two electrodes 22, 24. The separator 26 provides electrical separation-prevents physical contact-between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and the positive electrode 24. In certain variations, the separator 26 may be formed by a solid-state electrolyte 30. For example, the separator 26 may be defined by a plurality of solid-state electrolyte particles (not shown).

A negative electrode current collector 32 may be positioned at or near the negative electrode 22, and a positive electrode current collector 34 may be positioned at or near the positive electrode 24. The negative electrode current collector 32 may be a metal foil (e.g., solid or meshed or clad foil), metal grid or screen, or expanded metal comprising copper or any other appropriate electrically conductive material known to those of skill in the art. In certain variations, a surface of the negative electrode current collector 32 may comprise a metal foil that is surface treated, for example, carbon coated and/or etched. In each instance, the negative electrode current collector 32 may have a thickness greater than or equal to about 4 µm to less than or equal to about 50 µm and in certain aspects, optionally about 6 µm. The positive electrode current collector 34 may be a metal foil (e.g., solid or meshed or clad foil), metal grid or screen, or expanded metal comprising aluminum or any other appropriate electrically conductive material known to those of skill in the art. In certain variations, a surface of a positive electrode current collector 34 may comprise a metal foil that is surface treated, for example, carbon coated and/or etched. In each instance, the positive electrode current collector 34 may have a thickness greater than or equal to about 5 µm to less than or equal to about 50 µm and in certain aspects, optionally about 12 µm.

The negative electrode current collector 32 and the positive electrode current collector 34 respectively collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 towards the positive electrode 24. Lithium ions that are also produced at the negative electrode 22 are concurrently transferred through the electrolyte 30 contained in the separator 26 towards the positive electrode 24. The electrons flow through the external circuit 40 and the lithium ions migrate across the separator 26 containing the electrolyte 30 to form intercalated lithium at the positive electrode 24. As noted above, electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source (e.g., charging device) to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back towards the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative electrode current collector 32, negative electrode 22, separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation. However, the current technology also apply to solid-state batteries that include solid-state electrolytes (and solid-state electroactive particles) that may have a different design, as known to those of skill in the art.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be fully or partially powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. The electrolyte 30 may be a non-aqueous liquid electrolyte solution that includes a lithium salt dissolved in an organic solvent or a mixture of organic solvents. For example, the electrolyte 30 may include two or more lithium salts. The two or more lithium salts include lithium bis(fluorosulfonyl) imide (LiN(FSO$_2$)$_2$) (LIFSI) and lithium perchlorate (LiClO$_4$). For example, lithium bis(fluorosulfonyl)imide (LiN (FSO$_2$)$_2$) (LIFSI) may be included as a first lithium salt of the two or more lithium salts, and lithium perchlorate (LiClO$_4$) may be included as a second lithium salt of the two or more lithium salts. The electrolyte 30 may include, for example, greater than or equal to about 0.1M to less than or equal to about 0.9M, and in certain instances, optionally less than about 0.6 M, of the first lithium salt; and greater than or equal to about 0.1M to less than or equal to about 0.9M of the second lithium salt. Lithium perchlorate (LiClO$_4$) may help to control and/or improve capacity decay within the battery 20 and may also suppress corrosion (such as aluminum corrosion) therein. Lithium bis(fluorosulfonyl) imide (LiN(FSO$_2$)$_2$) (LIFSI) may help to control and/or improve conductivity of the electrolyte 30. For example, battery 20 including lithium bis(fluorosulfonyl)imide (LiN (FSO$_2$)$_2$) (LIFSI) may have a conductivity of about 8 ms/cm, and in certain aspects, optionally about 9 ms/cm.

In certain aspects, the electrolyte 30 may include one or more additional lithium salts, for example, a third lithium salt. For example, the electrolyte 30 may include, for example, greater than or equal to about 0.1M to less than or equal to about 0.9M of the one or more additional lithium salts. The one or more additional lithium salts may include one or more cations coupled with one or more anions. The cations may be selected from Li$^+$, Na$^+$, K$^+$, Al$^{3+}$, Mg$^{2+}$, and the like. The anions may be selected from PF$^{6-}$, BF$^{4-}$, TFSI$^-$, FSI$^-$, CF$_3$SO$_3$., (C$_2$F$_5$S$_2$O$_2$)N$^-$, and the like.

For example, a non-limiting list of lithium salts that may be used as the one or more additional lithium salts (e.g., third lithium salt) includes lithium hexafluorophosphate (LiPF$_6$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium tetraphenylborate (LiB(C$_6$H$_5$)$_4$), lithium bis(oxalato)borate (LiB(C$_2$O$_4$)$_2$) (LiBOB), lithium difluoro(oxalato)borate (LiBF$_2$(C$_2$O$_4$)) (LiDFOB), lithium hexafluoroarsenate (LiAsF$_6$), lithium trifluoromethanesulfonate (LiCF$_3$SO$_3$), lithium bis (trifluoromethane)sulfonylimide (LiN(CF$_3$SO$_2$)$_2$), lithium 4,5-dicyano-2-trifluoromethyl-imidazolide (LiTDI), lithium bis(2-methyl-2-fluoromalonato)borate (LiBMFMB), lithium tetrakis (2,2,2-trifluoroethoxy)borate (LiTTFB), lithium nonafluorobutanesulfonate (LiC$_4$F$_9$SO$_3$) (LiNFBS), lithium trifluoroacetate (Li[CF$_3$CO$_2$]), Li[C$_2$F$_5$CO$_2$], Li[PF$_2$(C$_2$O$_4$)$_2$], lithium tetrafluoro(oxalato)phosphate (Li[PF$_4$C$_2$O$_4$]), Li[N(FSO$_2$)$_2$], perfluoroalkyl sulfonyl lithium methide (Li[C(CF$_3$SO$_2$)$_3$]), Li[N(SO$_2$C$_2$F$_5$)$_2$], lithium alkyl fluorophosphates, Li[B(C$_2$O$_4$)$_2$], Li[BF$_2$C$_2$O$_4$], Li$_2$[B$_{12}$X$_{12-k}$H$_k$] (where X is OH, F, Cl, or Br; where 0≤k≤12; and where 0≤k'≤10), and combinations thereof.

The two or more lithium salts and/or the one or more additional lithium salts may be dissolved in a variety of non-aqueous aprotic organic solvents including but not limited to, various alkyl carbonates (arbonates), such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

In certain variations, the two or more lithium salts and/or the one or more additional lithium salts may be dissolved in a variety of non-aqueous aprotic organic solvents including a solid electrolyte interface (SEI) former. For example, a fluorinated solvent, such as a fluorinated cyclic carbonate (e.g., fluoroethylene carbonate (FEC)), may be particularly suited to cause the formation of a protective solid electrolyte interface (SEI) layer on the negative electrode 22. The solvent may include, for example, fluoroethylene carbonate (FEC) as a first solvent, and one or more co-solvents. For example, the solvent may include greater than or equal to about 5 vol.% to less than or equal to about 95 vol. % of the first solvent and greater than or equal to about 5 vol.% to less than or equal to about 95 vol. % of the one or more co-solvents. The one or more co-solvents may be added to adjust the viscosity and/or wettability of the electrolyte 30.

Example fluorinated cyclic carbonates may be generally represented by:

where $R^1$ and $R^2$ are individually selected from: H, F, Cl, Br, I, CN, oxo, $OR^9$ (where $R^9$ may be H, alkyl, alkenyl, alkynyl, aryl, aralkyl, or heterocyclyl), alkyl, alkenyl, alkynyl, silyl, siloxy, —C(O)$R^{10}$ (where $R^{10}$ may be H, alkyl, alkenyl, alkynyl, aryl, aralkyl, or heterocyclyl), —C(O)O$R^{10}$ (where $R^{10}$ may be H, alkyl, alkenyl, alkynyl, aryl, aralkyl, or heterocyclyl), and —OC(O)$R^{10}$ (where $R^{10}$ may be H, alkyl, alkenyl, alkynyl, aryl, aralkyl, or heterocyclyl). In certain instances, $R^1$ and $R^2$ are individually selected from F, $C_nH_xF_y$ (where $1 \leq n \leq 12$, $1 \leq x \leq 3$, and where $0 \leq y \leq 3$), $CH_2C_nH_xF_y$ (where $1 \leq n \leq 12$, $1 \leq x \leq 3$, and where $0 \leq y \leq 3$), $CH_2OC_nH_{1-y}F_y$ (where $1 \leq n \leq 12$, $1 \leq x \leq 3$, and where $0 \leq y \leq 3$), and $CF_2OC_nH_xF_y$ (where $1 \leq n \leq 12$, $1 \leq x \leq 3$, and where $0 \leq y \leq 3$).

The one or more co-solvents may be linear carbonates. Example linear carbonates may be generally represented by:

where $R^1$ and $R^2$ are individually selected from: H, F, Cl, Br, I, CN, oxo, $OR^9$ (where $R^9$ may be H, alkyl, alkenyl, alkynyl, aryl, aralkyl, or heterocyclyl), alkyl, alkenyl, alkynyl, silyl, siloxy, —C(O)$R^{10}$ (where $R^{10}$ may be H, alkyl, alkenyl, alkynyl, aryl, aralkyl, or heterocyclyl), —C(O)O$R^{10}$ (where $R^{10}$ may be H, alkyl, alkenyl, alkynyl, aryl, aralkyl, or heterocyclyl), and —OC(O)$R^{10}$ (where $R^{10}$ may be H, alkyl, alkenyl, alkynyl, aryl, aralkyl, or heterocyclyl). In certain instances, $R^1$ and $R^2$ are individually selected from F, $C_nH_xF_y$ (where $1 \leq n \leq 12$, $1 \leq x \leq 3$, and where $0 \leq y \leq 3$), $CH_2C_nH_xF_y$ (where $1 \leq n \leq 12$, $1 \leq x \leq 3$, and where $0 \leq y \leq 3$), $CH_2OC_nH_{1-y}F_y$ (where $1 \leq n \leq 12$, $1 \leq x \leq 3$, and where $0 \leq y \leq 3$), and $CF_2OC_nH_xF_y$ (where $1 \leq n \leq 12$, $1 \leq x \leq 3$, and where $0 \leq y \leq 3$). For example, in certain instances, the one or more co-solvents may be linear carbonates, such as dimethyl carbonate (DMC), diethyl carbonate (DEC), ethylmethylcarbonate (EMC), 1,2-dimethoxyethane (DME), and the like.

Figure 2A:
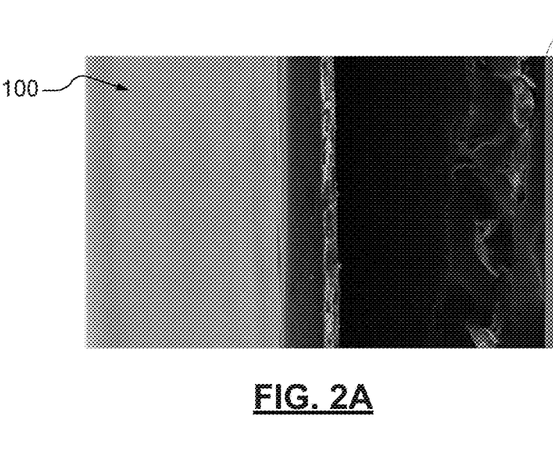
FIGS. 2A-2D are scanning electron microscopy (SEM) images of example (pristine and harvested) lithium metal electrodes.
Figure 2B:
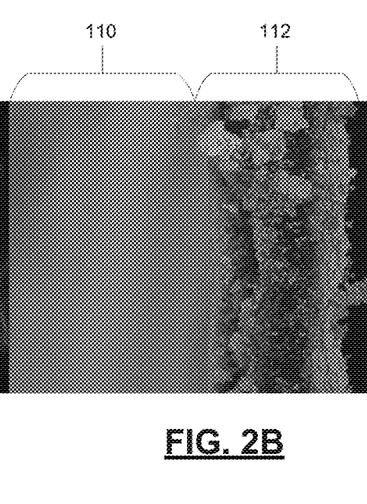
Figure 2C:
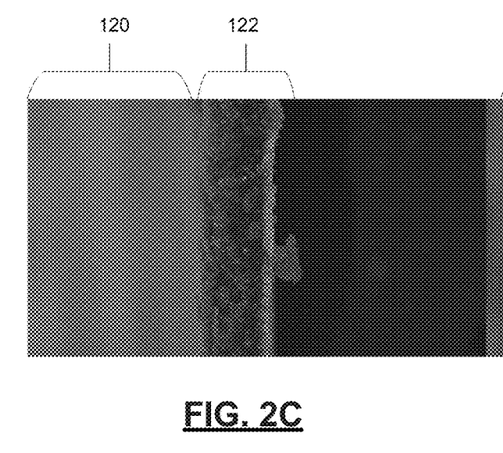
Figure 2D:
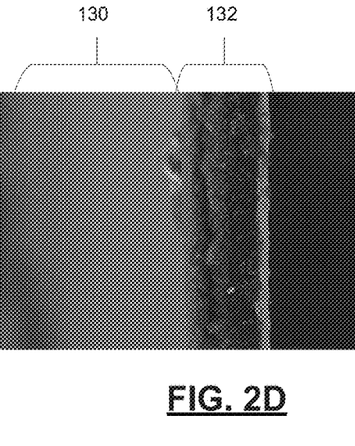

An aged porous lithium electrode with protective kinetic barrier (e.g., solid electrolyte interface (SEI) layer) and controlled porosity may minimize or prevent continuous electrolyte consumption and lithium ion loss in a manner so as to prevent capacity loss in the battery 20. The protective solid electrolyte interface (SEI) layer may also, in various instances, suppress or minimize dendrite formation. The selection of the lithium salt may also effect the formation of the solid electrolyte interface (SEI) layer and the aged morphology (e.g., porosity) of the negative electrode 22. For example, FIGS. 2A-2D provide scan electron microscopy (SEM) images of example lithium metal electrode having different electrolyte systems. By way of comparison, FIG. 2A is a scan electron microscopy (SEM) image of a pristine lithium metal electrode 100. As the skilled artisan will recognized, bulk lithium (such as illustrated in FIG. 2A) may be turned into porous lithium (such as illustrated in FIGS. 2B-2D) during cycling.

FIG. 2B is a scanning electron microscopy (SEM) image of a harvested porous lithium metal electrode 110 having a protective solid electrolyte interface (SEI) layer 112 prepared in part by an electrolyte comprising 1.2 M lithium bis(fluorosulfonyl)imide (LiN(FSO$_2$)$_2$) (LIFSI) and a solvent mixture comprising fluoroethylene carbonate (FEC) and ethylmethylcarbonate (EMC). The solvent mixture may include 1 volumetric part fluoroethylene carbonate (FEC) to 4 volumetric parts ethylmethylcarbonate (EMC). In such instances, the protective solid electrolyte interface (SEI) layer 112 may have a comparative large thickness. As illustrated, the protective solid electrolyte interface (SEI) layer 112 may have a substantially uneven surface and a substantially large porosity. The large porosity of the protective solid electrolyte interface (SEI) layer 112 may be undesirable insofar as the larger surface area requires higher or greater amounts of the electrolyte, which can cause high capacity decay rate towards the end of cycle life. For example, the larger porosity and electrolyte consumption can cause the thickness of the negative electrode 110 to increase during cycling, which may lead to undesirable pressure build-up within the cell.

FIG. 2C is a scanning electron microscopy (SEM) image of a harvested porous lithium metal electrode 120 having a protective solid electrolyte interface (SEI) layer 122 prepared in part by an electrolyte comprising 1.2 M lithium perchlorate (LiClO$_4$) and a solvent mixture comprising fluoroethylene carbonate (FEC) and ethylmethylcarbonate (EMC). The solvent mixture may include 1 volumetric part fluoroethylene carbonate (FEC) to 4 volumetric parts ethylmethylcarbonate (EMC). As illustrated, the protective solid electrolyte interface (SEI) layer 122 may also have a comparatively high reactive surface due as a result of the highly oxidized LiClO$_4$. The harvested (i.e., aged) lithium metal electrode 122 may have a porosity smaller than the porosity of the lithium metal electrode 110.

FIG. 2D scanning electron microscopy (SEM) image of a harvested porous lithium metal electrode 130 having a protective solid electrolyte interface (SEI) layer 132 prepared in part by an electrolyte comprising 0.6M lithium bis(fluorosulfonyl)imide (LiN(FSO$_2$)$_2$) (LIFSI) and 0.6M lithium perchlorate (LiClO$_4$) and a solvent mixture comprising fluoroethylene carbonate (FEC) and ethylmethylcarbonate (EMC). The solvent mixture may include 1 volumetric part fluoroethylene carbonate (FEC) to 4 volumetric parts ethylmethylcarbonate (EMC). As illustrated, the harvested (i.e., aged) lithium metal electrode 132 may also have a substantially less reactive surface. As illustrated in the comparison of FIGS. 2A-2D, the electrolyte may be used to control the morphology and thickness of a protective solid electrolyte interface (SEI) layer.

With renewed reference to FIG. 1, the separator 26 may be a porous separator that is used to separate the negative and positive electrodes 22, 24 and to minimize or prevent short-circuiting. The separator 26 may be a polymer or ceramic or mixed separator. For example, the separator 26 may include, but is not limited to, polypropylene (PP), polyethylene (PE), trilayer (PP/PE/PP), paper, or polymer films. Commercially available polyolefin porous separator membranes 26 include CELGARD® 2500 (a monolayer polypropylene separator) and CELGARD®2320 (a trilayer polypropylene/polyethylene/polypropylene separator) available from Celgard LLC.

In various instances, the separator 26 may include one or more coatings and/or filings that can improve thermostability and mechanical strength and/or wettability and current distribution of the separator 26. Such separator coatings and/or filling may aid particularly in the wettability of the separator 26 by electrolytes having different polarities. For example, the separator 26 may be a surface-modified separator. In certain aspects, the separator 26 may include one or more ultrathin (e.g., greater than or equal to about 10 nm to less than or equal to about 5 μm) ceramic coatings. For example, ceramic coatings may be disposed (for example, using an atomic layer deposition process) on one or more exposed surfaces of the separator 26, including pore walls. Such ceramic coatings may include, for example, zeolite, alumina, silica, phosphates, ceramic electrolytes (e.g., lithium lanthanum zirconium oxide (LLZO)), glassy electrolytes (e.g., LiPON, PEO, combinations of polymers and ceramic), and the like. The separator 26 may include, in certain aspects, one or more ultrathin (e.g., greater than or equal to about 100 nm to less than or equal to about 10 μm) polymer coatings. For example, polymer coatings may be disposed (for example, using an atomic layer deposition process) on one or more exposed surfaces of the separator 26, including pore walls. Such polymer coatings may include, for example, alucone, zirzone, poly(3,4-ethylenedioxythiophene)(PEDOT), metal organic framework (MOF) thin films, molecular layer deposited (MLD) polymer coatings, and the like. The separator 26 may include, in certain aspects, one or more ceramic fillings. For example, such ceramic fillings may include a plurality of small particles that substantially fill the pores of the separator 26. Generally, there is no chemical bonding and/or adhesion force between the filler materials and the pore walls of the separator 26. Such ceramic fillers may include, for example, alumina, silica, titania, ceramic electrolytes (e.g., lithium lanthanum zirconium oxide (LLZO), lithium aluminum titanium phosphate (LATP)), glassy electrolytes (e.g., LiPON, PEO, combinations of polymers and ceramic), and the like.

The negative electrode 22 comprises a lithium host material that is capable of functioning as a negative terminal of a lithium-ion battery. For example, the negative electrode 22 may comprise a lithium host material (e.g., negative electroactive material) that is capable of functioning as a negative terminal of the battery 20. In various aspects, the negative electrode 22 may be defined by a plurality of negative electroactive material particles (not shown). Such negative electroactive material particles may be disposed in one or more layers so as to define the three-dimensional structure of the negative electrode 22. The electrolyte 30 may be introduced, for example after cell assembly, and contained within pores (not shown) of the negative electrode 22. For example, the negative electrode 22 may include a plurality of electrolyte particles (not shown). The negative electrode 22 (including the one or more layers) may have a thickness greater than or equal to about 1 μm to less than or equal to about 2000 μm, and in certain aspects, optionally greater than or equal to about 10 μm to less than or equal to about 1000 μm.

The negative electrode 22 may include a negative electroactive material that comprises lithium, such as, for example, lithium metal. In certain variations, the negative electrode 22 is a film or layer formed of lithium metal or an alloy of lithium. Other materials can also be used to form the negative electrode 22, including, for example, carbonaceous materials (such as graphite, hard carbon, soft carbon), lithium-silicon and silicon containing binary and ternary alloys and/or tin-containing alloys (such as Si, Li—Si, SiOX, Si—Sn, SiSnFe, SiSnAl, SiFeCo, $SnO_2$, and the like), and/or metal oxides (such as $Fe_3O_4$). In certain alternative embodiments, lithium-titanium anode materials are contemplated, such as $Li_{4+x}Ti_5O_{12}$, where $0 \leq x \leq 3$, including lithium titanate ($Li_4Ti_5O_{12}$) (LTO).

The negative electroactive material may be optionally intermingled with one or more electrically conductive materials that provide an electron conductive path and/or at least one polymeric binder material that improves the structural integrity of the negative electrode 22. For example, the negative electroactive material in the negative electrode 22 may be optionally intermingled with binders such as bare alginate salts, poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), polyacrylate (PAA), lithium polyacrylate (LiPAA), sodium polyacrylate (NaPAA), sodium alginate, lithium alginate, ethylene propylene diene monomer (EPDM), and combinations thereof. Electrically conductive materials may include carbon-based materials, powder nickel or other metal particles, or a conductive polymer. Carbon-based materials may include, for example, particles of carbon black (e.g., Super-P), graphite, acetylene black (such as KETCHEN™ black or DENKA™ black), carbon fibers and nanotubes (e.g., vapor grown carbon fibers (VGCF)), graphene, graphene oxide, and the like. Examples of a conductive polymer include polyaniline, polythiophene, polyacetylene, polypyrrole, and the like.

For example, the negative electrode 22 may include greater than or equal to about 30 wt. % to less than or equal to about 99.5 wt. %, and in certain aspects, optionally greater than or equal to about 50 wt. % to less than or equal to about 95 wt. %, of the negative electroactive material; greater than or equal to about 0 wt. % to less than or equal to about 30 wt. %, and in certain aspects, optionally greater than or equal to about 0.5 wt. % to less than or equal to about 15 wt. %, of one or more electrically conductive materials; and greater than or equal to about 0 wt. % to less than or equal to about 20 wt. %, and in certain aspects, optionally greater than or equal to about 0.5 wt. % to less than or equal to about 10 wt. %, of one or more binders.

The positive electrode 24 may be formed from a lithium-based active material that is capable of undergoing lithium intercalation and deintercalation, alloying and dealloying, or plating and stripping, while functioning as the positive terminal of the battery 20. For example, the positive electrode 24 can be defined by a plurality of electroactive material particles (not shown) disposed in one or more layers so as to define the three-dimensional structure of the positive electrode 24. The electrolyte 30 may be introduced, for example after cell assembly, and contained within pores (not shown) of the positive electrode 24. For example, the positive electrode 24 may include a plurality of electrolyte particles (not shown). The positive electrode 24 (including the one or more layers) may have a thickness greater than about 150 μm.

The positive electrode 24 may comprise a positive electroactive material that has a low-tap-density material (e.g., less than or equal to about 2 g/cc) and/or that has large specific surface area (e.g., greater than or equal to about 20 $m^2/g$) and/or that has small secondary particles sizes (e.g., D50 less than or equal to about 3 μm). For example, the positive electroactive material may comprise one or more lithium manganese iron phosphates ($LiMn_xFe_{1-x}PO_4$, where $0 \leq x \leq 1$) (LMFP), such as $LiMn_{0.7}Fe_{0.3}PO_4$, $LiMn_{0.6}Fe_{0.4}PO_4$, $LiMn_{0.8}Fe_{0.2}PO_4$, $LiMn_{0.75}Fe_{0.25}PO_4$, by way of non-limiting example. In certain aspects, the one or more lithium manganese iron phosphates ($LiMn_xFe_{1-x}PO_4$, where $0 \leq x \leq 1$) (LMFP) may be doped with one or more dopants, such as magnesium (Mg), aluminum (Al), yttrium (Y), scandium (Sc), and the like. For example, the positive electroactive material may include one or more of $LiMn_{0.7}Mg_{0.05}Fe_{0.25}PO_4$, $LiMn_{0.75}Al_{0.05}Fe_{0.2}PO_4$, $LiMn_{0.75}Al_{0.03}Fe_{0.22}PO_4$, $LiMn_{0.75}Al_{0.03}Fe_{0.22}PO_4$, $LiMn_{0.7}Y_{0.02}Fe_{0.29}PO_4$, $LiMn_{0.7}Mg_{0.02}Al0.03Fe_{0.25}PO_4$, and the like. The one or more lithium manganese iron phosphates ($LiMn_xFe_{1-x}PO_4$, where $0 \leq x \leq 1$) (LMFP) may be doped with about 10 wt. % of the one or more dopants.

In each instance, such lithium manganese iron phosphate ($LiMn_xFe_{1-x}PO_4$, where $0 \leq x \leq 1$) (LMFP) electroactive material particles may have an average primary particle size greater than or equal to about 10 nm to less than or equal to about 250 nm; a tap density greater than or equal to about 0.4 g/cc to less than or equal to about 2.0 g/cc, optionally about 0.4 g/cc to less than or equal to about 1 g/cc, optionally about 0.8 g/cc, and in certain aspects, optionally about 0.5 g/cc; and a specific area greater than or equal to about 3 $m^2/g$ to less than or equal to about 50 $m^2/g$, and in certain aspects, optionally about 34.3 $m^2/g$.

The positive electroactive materials may be optionally intermingled with an electronically conducting material that provides an electron conduction path and/or at least one polymeric binder material that improves the structural integrity of the electrode. For example, the positive electroactive materials and electronically or electrically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), polyacrylate (PAA), lithium polyacrylate (LiPAA), sodium polyacrylate (NaPAA), sodium alginate, or lithium alginate. Electrically conducting materials may include carbon-based materials, powdered nickel or other metal particles (e.g., metal wire and/or metal oxides), or a conductive polymer. Carbon-based materials may include, for example, particles of graphite, carbon black (such as Super-P), acetylene black (such as KETCHEN™ black or DENKA™ black), carbon fibers and nanotubes (e.g., vapor grown carbon fibers (VGCF)), graphene, graphene oxide, and the like. Examples of a conductive polymer include polyaniline, polythiophene, polyacetylene, polypyrrole, and the like. In certain aspects, mixtures of the conductive materials may be used.

For example, the positive electrode 24 may include greater than or equal to about 30 wt. % to less than or equal to about 98 wt. %, and in certain aspects, optionally greater than or equal to about 80 wt. % to less than or equal to about 95 wt. %, of the positive electroactive material; greater than or equal to about 0 wt. % to less than or equal to about 30 wt. %, and in certain aspects, optionally greater than or equal to about 0.5 wt. % to less than or equal to about 15 wt. %, of one or more electrically conductive materials; and greater than or equal to about 0 wt. % to less than or equal to about 20 wt. %, and in certain aspects, optionally greater than or equal to about 0.5 wt. % to less than or equal to about 10 wt. %, of one or more binders.

Certain features of the current technology are further illustrated in the following non-limiting examples.

Example 1

Figure 3:
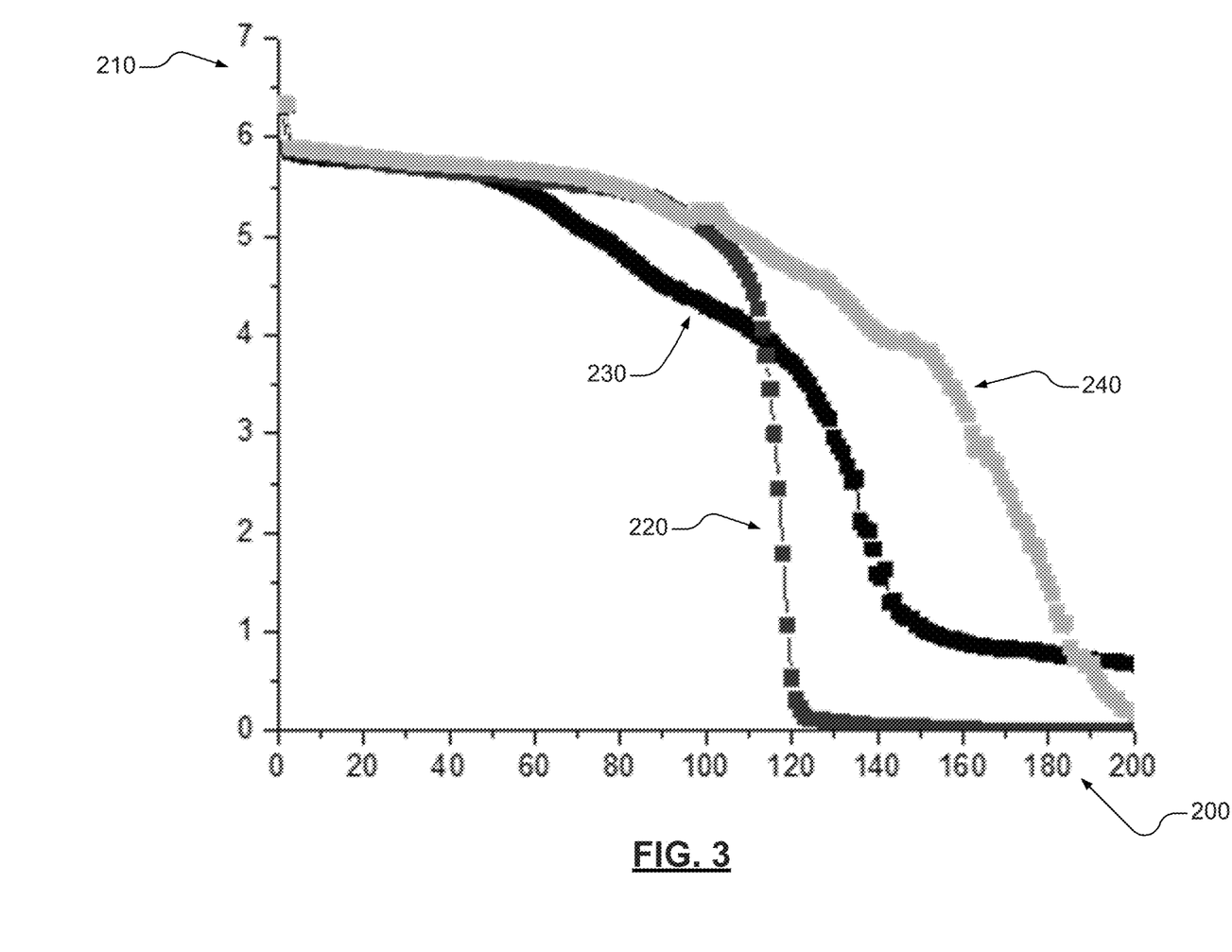
FIG. 3 is a graphical illustration of the capacity retention per cycle of comparative electrochemical cells having different electrolyte systems.

FIG. 3 shows the capacity retention of comparative electrochemical cells 220, 230, 240 at applied voltages between 2.5 V and 4.3 V and 0.2C charge, 0.5C discharge. The y-axis 210 depicts the capacity in milliamp hour (mAh), while the cycle number is shown on the x-axis 200.

Electrochemical cell 2120 includes a first electrolyte system. The first electrolyte system may include 1.2 M lithium bis(fluorosulfonyl)imide ($LiN(FSO_2)_2$) (LIFSI) and a solvent mixture comprising fluoroethylene carbonate (FEC) and ethylmethylcarbonate (EMC). The solvent mixture may include 1 volumetric part fluoroethylene carbonate (FEC) to 4 volumetric parts ethylmethylcarbonate (EMC). As illustrated, electrochemical cell 220 may experience sudden capacity fade.

Electrochemical cell 230 includes a second electrolyte system. For example, the second electrolyte system may include 1.2 M lithium perchlorate ($LiClO_4$) and a solvent mixture comprising fluoroethylene carbonate (FEC) and ethylmethylcarbonate (EMC). The solvent mixture may include 1 volumetric part fluoroethylene carbonate (FEC) to 4 volumetric parts ethylmethylcarbonate (EMC). Electrochemical cell 230 may have low conductivity, and as a result, a limited cycle life, as illustrated.

Electrochemical cell 240 includes a third electrolyte system. The third electrolyte system may be prepared in accordance with certain teachings of the present disclosure. The third electrolyte system may include 0.6M lithium bis(fluorosulfonyl)imide ($LiN(FSO_2)_2$) (LIFSI) and 0.6M lithium perchlorate ($LiClO_4$) and a solvent mixture comprising fluoroethylene carbonate (FEC) and ethylmethylcarbonate (EMC). The solvent mixture may include 1 volumetric part fluoroethylene carbonate (FEC) to 4 volumetric parts ethylmethylcarbonate (EMC). Electrochemical cell 240, prepared in accordance with certain aspects of the present disclosure, has improved or enhance cycling performance and reduced capacity fade. The electrochemical cell 240 has improved or enhanced the cycle life.

Example 2

Figure 4:
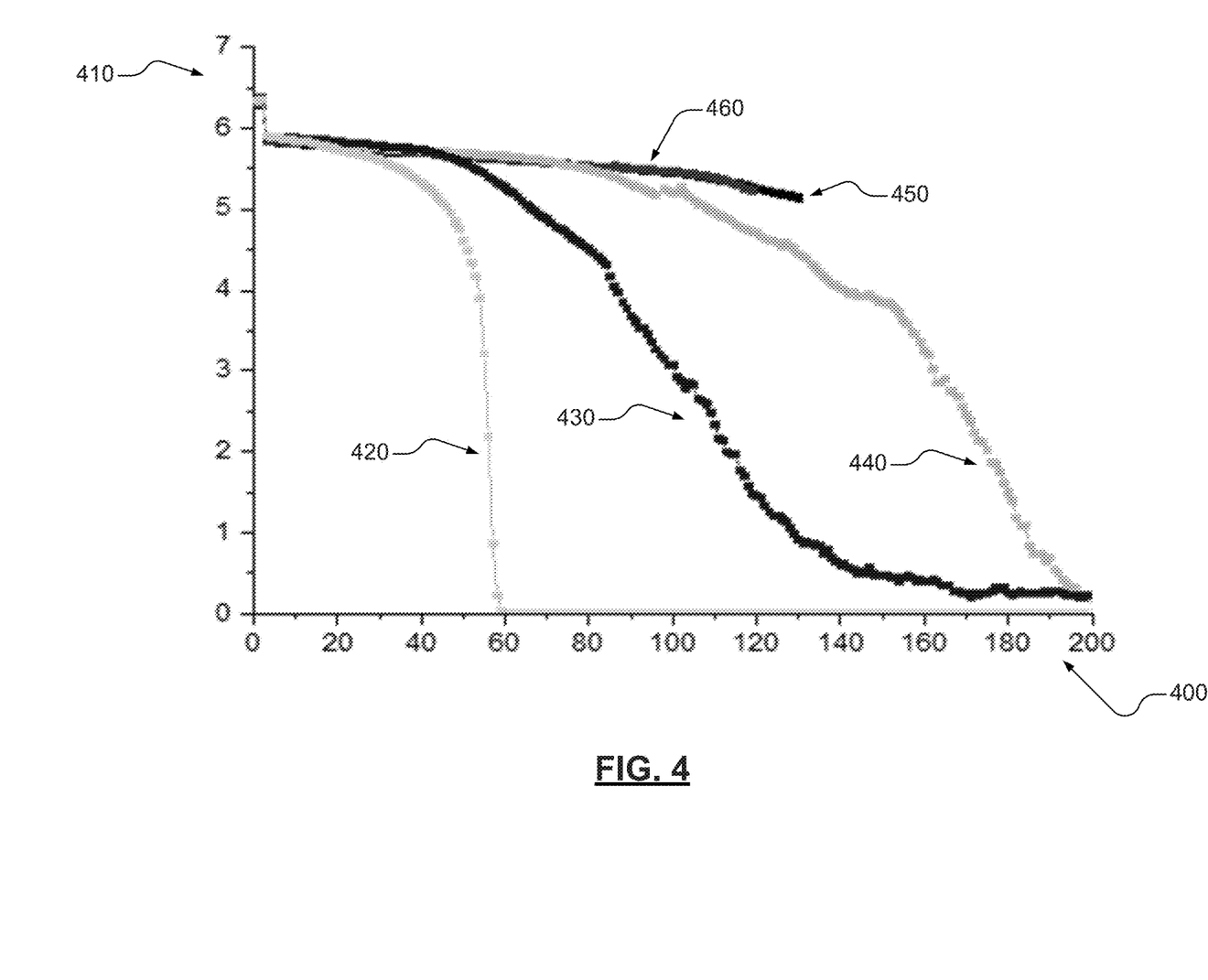
FIG. 4 is a graphical illustration of the capacity retention per cycle of comparative electrochemical cells having different separators.

FIG. 4 shows the capacity retention of comparative electrochemical cells 420, 430, 440, 450, 460 at applied voltages between 2.5 V and 4.3V and 0.2C charge, 0.5C discharge. The y-axis 310 depicts the capacity in milliamp hour (mAh), while the cycle number is shown on the x-axis 300.

Electrochemical cell 420 includes a first electrolyte system and a conventional separator (e.g., a CELGARD® 2320 (a trilayer polypropylene/polyethylene/polypropylene separator) available from Celgard LLC). The first electrolyte system may include 1.2 M lithium hexafluorophosphate ($LiPF_6$) and a solvent mixture comprising fluoroethylene carbonate (FEC) and ethylmethylcarbonate (EMC). The solvent mixture may include 1 volumetric part fluoroethylene carbonate (FEC) to 4 volumetric parts ethylmethylcarbonate (EMC). As illustrated, electrochemical cell 420 may experience early, sudden capacity fade.

Electrochemical cell 430 includes a second electrolyte system and a zeolite-modified separator, for example a zeolite-modified polyethylene (PE). The second electrolyte system may be prepared in accordance with certain teachings of the present disclosure. For example, the second electrolyte system may include 0.6M lithium bis(fluorosulfonyl)imide ($LiN(FSO_2)_2$) (LIFSI) and 0.6M lithium perchlorate ($LiClO_4$) and a solvent mixture comprising fluoroethylene carbonate (FEC) and ethylmethylcarbonate (EMC). The solvent mixture may include 1 volumetric part fluoroethylene carbonate (FEC) to 4 volumetric parts ethylmethylcarbonate (EMC).

Electrochemical cell 440 includes a third electrolyte system and a conventional separator (e.g., a CELGARD® 2320 (a trilayer polypropylene/polyethylene/polypropylene separator) available from Celgard LLC). The third electrolyte system may also be prepared in accordance with certain teachings of the present disclosure. For example, the third electrolyte system may include 0.6M lithium bis(fluorosulfonyl)imide (LiN(FSO$_2$)$_2$) (LIFSI) and 0.6M lithium perchlorate (LiClO$_4$) and a solvent mixture comprising fluoroethylene carbonate (FEC) and ethylmethylcarbonate (EMC). The solvent mixture may include 1 volumetric part fluoroethylene carbonate (FEC) to 4 volumetric parts ethylmethylcarbonate (EMC).

Electrochemical cell 450 includes a forth electrolyte system and a first surface-modified separator. The fourth electrolyte system may also be prepared in accordance with certain teachings of the present disclosure. For example, the forth electrolyte system may include 0.6M lithium bis(fluorosulfonyl)imide (LiN(FSO$_2$)$_2$) (LIFSI) and 0.6M lithium perchlorate (LiClO$_4$) and a solvent mixture comprising fluoroethylene carbonate (FEC) and ethylmethylcarbonate (EMC). The solvent mixture may include 1 volumetric part fluoroethylene carbonate (FEC) to 4 volumetric parts ethylmethylcarbonate (EMC). The surface-modified separator may be prepared in accordance with certain teachings of the present disclosure. For example, the surface-modified separator may be a silica-coated polyethylene (PE) separator.

Electrochemical cell 450 includes a fifth electrolyte system and a second surface-modified separator. The fifth electrolyte system may also be prepared in accordance with certain teachings of the present disclosure. For example, the fifth electrolyte system may include 0.6M lithium bis(fluorosulfonyl)imide (LiN(FSO$_2$)$_2$) (LIFSI) and 0.6M lithium perchlorate (LiClO$_4$) and a solvent mixture comprising fluoroethylene carbonate (FEC) and ethylmethylcarbonate (EMC). The solvent mixture may include 1 volumetric part fluoroethylene carbonate (FEC) to 4 volumetric parts ethylmethylcarbonate (EMC). The surface-modified separator may be prepared in accordance with certain teachings of the present disclosure. For example, the surface-modified separator may be an alucone-coated polyethylene (PE) separator.

As illustrated, electrochemical cells prepared in accordance with certain teachings of the present disclosure, like electrochemical cells 440, 450 including both an electrolyte have a specific composition and a surface-modified separator, have improved cycling performance and reduced capacity fade.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrochemical cell that cycles lithium ions comprising:
   a separator having a plurality of pores and one or more coatings at least partially coating pore walls of the plurality of pores, at least one of the one or more coatings comprising alucone; and
   a liquid electrolyte system at least partially filling the pores, wherein the liquid electrolyte system comprises:
   two or more lithium salts, wherein the two or more lithium salts comprises greater than or equal to about 0.1M to less than or equal to about 0.9M of a first lithium salt and greater than or equal to about 0.1M to less than or equal to about 0.9M of a second lithium salt, wherein the first lithium salt is lithium bis(fluorosulfonyl)imide (LiN(FSO$_2$)$_2$) (LIFSI) and the second lithium salt is lithium perchlorate (LiClO$_4$); and
   two or more solvents, wherein the two or more solvents comprises a first solvent and a second solvent, wherein the first solvent is a fluorinated cyclic carbonate and the second solvent is a linear carbonate, wherein a volumetric ratio of the first solvent to the second solvent is 1:4.

2. The electrochemical cell of claim 1, wherein the two or more lithium salts further comprises greater than or equal to about 0.1M to less than or equal to about 0.9M of a third lithium salt.

3. The electrochemical cell of claim 2, wherein the third lithium salt is selected from the group consisting of: lithium hexafluorophosphate (LiPF$_6$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium tetraphenylborate (LiB(C$_6$H$_5$)$_4$), lithium bis(oxalato)borate (LiB(C$_2$O$_4$)$_2$) (LiBOB), lithium difluoro (oxalato)borate (LiBF$_2$(C$_2$O$_4$)) (LiDFOB), lithium hexafluoroarsenate (LiAsF$_6$), lithium trifluoromethanesulfonate (LiCF$_3$SO$_3$), lithium bis(trifluoromethane)sulfonylimide (LiN(CF$_3$SO$_2$)$_2$), lithium 4,5-dicyano-2-trifluoromethyl-imidazolide (LiTDI), lithium bis(2-methyl-2-fluoromalonato)borate (LiBMFMB), lithium tetrakis (2,2,2-trifluoroethoxy)borate (LiTTFB), lithium nonafluorobutanesulfonate (LiC$_4$F$_9$SO$_3$) (LiNFBS), lithium trifluoroacetate (Li[CF$_3$CO$_2$]), Li[C$_2$F$_5$CO$_2$], Li[PF$_2$(C$_2$O$_4$)$_2$], lithium tetrafluoro(oxalato)phosphate (Li[PF$_4$C$_2$O$_4$]), Li[N(FSO$_2$)$_2$], perfluoroalkyl sulfonyl lithium methide (Li[C(CF$_3$SO$_2$)$_3$]), Li[N(SO$_2$C$_2$F$_5$)$_2$], lithium alkyl fluorophosphates, Li[B(C$_2$O$_4$)$_2$], Li[BF$_2$C$_2$O$_4$], Li$_2$[B$_{12}$X$_{12-k}$H$_k$] (where X is OH, F, Cl, or Br; where 0≤k≤12; and where 0≤k'≤10), and combinations thereof.

4. The electrochemical cell of claim 1, wherein the fluorinated cyclic carbonate comprises fluoroethylene carbonate (FEC), and the linear carbonate is selected from the group consisting of: carbonate (DMC), diethyl carbonate (DEC), ethylmethylcarbonate (EMC), 1,2-dimethoxyethane (DME), and combinations thereof.

5. The electrochemical cell of claim 1, wherein the one or more coatings are ultrathin coatings having a thickness greater than or equal to about 100 μm to less than or equal to about 10 μm.

6. The electrochemical cell of claim 1, wherein the one or more coatings further comprise one or more ceramic coatings, wherein the one or more ceramic coatings comprise ceramic materials selected from the group consisting of: alumina, silica, phosphates, ceramic electrolytes, glassy electrolytes, and combinations thereof.

7. The electrochemical cell of claim 1, wherein the separator comprises one or more fillers.

8. The electrochemical cell of claim 7, wherein the one or more fillers comprise one or more ceramic fillings, wherein the one or more ceramic filings comprise ceramic materials selected from the group consisting of: alumina, silica, titania, ceramic electrolytes, glassy electrolytes, and combinations thereof.

9. The electrochemical cell of claim 1, wherein the electrochemical cell further comprises a lithium metal electrode, and wherein the liquid electrolyte system comprises less than or equal to about 0.6M of lithium bis(fluorosulfonyl)imide (LiN(FSO$_2$)$_2$) (LIFSI).

10. The electrochemical cell of claim 9, wherein a solid electrolyte interface (SEI) layer is formed on an exposed surface of the electrode.

11. An electrochemical cell that cycles lithium ions comprising:
a positive electrode having a first plurality of pores;
a negative electrode having a second plurality of pores comprising a lithium metal;
a separator disposed between the positive electrode and the negative electrode, the separator having a third plurality of pores and one or more coatings at least partially coating pore walls of the third plurality of pores, at least one of the one or more coatings comprising alucone; and
a liquid electrolyte system that at least partially fills the first plurality of pores, the second plurality of pores, and the third plurality of pores and also voids between the positive electrode, the negative electrode, and the separator, wherein the liquid electrolyte system comprises:
two or more lithium salts, wherein the two or more lithium salts comprises greater than or equal to about 0.1M to less than or equal to about 0.9M of a first lithium salt and greater than or equal to about 0.1M to less than or equal to about 0.9M of a second lithium salt, wherein the first lithium salt is lithium bis(fluorosulfonyl)imide (LiN(FSO$_2$)$_2$) (LIFSI) and the second lithium salt is lithium perchlorate (LiClO$_4$); and
two or more solvents, wherein the two or more solvents comprises a first solvent and a second solvent, wherein the first solvent is fluoroethylene carbonate (FEC) and the second solvent is selected from the group consisting of: dimethyl carbonate (DMC), diethyl carbonate (DEC), ethylmethylcarbonate (EMC), 1,2-dimethoxyethane (DME), and combinations thereof.

12. The electrochemical cell of claim 11, wherein the two or more lithium salts further comprises greater than or equal to about 0.1M to less than or equal to about 0.9M of a third lithium salt.
wherein the third lithium salt is selected from the group consisting of: lithium hexafluorophosphate (LiPF$_6$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium tetraphenylborate (LiB(C$_6$H$_5$)$_4$), lithium bis(oxalato)borate (LiB(C$_2$O$_4$)$_2$) (LiBOB), lithium difluoro(oxalato)borate (LiBF$_2$(C$_2$O$_4$)) (LiDFOB), lithium hexafluoroarsenate (LiAsF$_6$), lithium trifluoromethanesulfonate (LiCF$_3$SO$_3$), lithium bis(trifluoromethane)sulfonylimide (LiN(CF$_3$SO$_2$)$_2$), lithium 4,5-dicyano-2-trifluoromethyl-imidazolide (LiTDI), lithium bis(2-methyl-2-fluoromalonato)borate (LiBMFMB), lithium tetrakis(2,2,2-trifluoroethoxy)borate (LiTTFB), lithium nonafluorobutanesulfonate (LiC$_4$F$_9$SO$_3$) (LiNFBS), lithium trifluoroacetate (Li[CF$_3$CO$_2$]), Li[C$_2$F$_5$CO$_2$], Li[PF$_2$(C$_2$O$_4$)$_2$], lithium tetrafluoro(oxalato)phosphate (Li[PF$_4$C$_2$O$_4$]), Li[N(FSO$_2$)$_2$], perfluoroalkyl sulfonyl lithium methide (Li[C(CF$_3$SO$_2$)$_3$]), Li[N(SO$_2$C$_2$F$_5$)$_2$], lithium alkyl fluorophosphates, Li[B(C$_2$O$_4$)$_2$], Li[BF$_2$C$_2$O$_4$], Li$_2$[B$_{12}$X$_{12-k}$H$_k$] (where X is OH, F, Cl, or Br; where 0≤k≤12; and where 0≤k'≤10), and combinations thereof.

13. The electrochemical cell of claim 11, wherein the one or more coatings are ultrathin coatings having a thickness greater than or equal to about 100 nanometers to less than or equal to about 10 micrometers.

14. The electrochemical cell of claim 13, wherein the one or more coatings further comprise one or more ceramic coatings, wherein the one or more ceramic coatings comprise ceramic materials selected from the group consisting of: alumina, silica, phosphates, ceramic electrolytes, glassy electrolytes, and combinations thereof.

15. The electrochemical cell of claim 11, wherein the separator comprises one or more fillers, wherein the one or more fillers comprise one or more ceramic fillings, wherein the one or more ceramic filings comprise ceramic materials selected from the group consisting of: alumina, silica, titania, ceramic electrolytes, glassy electrolytes, and combinations thereof.

16. The electrochemical cell of claim 13, wherein a solid electrolyte interface (SEI) layer is formed on an exposed surface of the electrode.

17. An electrochemical cell that cycles lithium ions comprising:
a negative electrode having a first plurality of pores and comprising a lithium metal;
a surface-modified separator having a second plurality pores and comprising one or more coatings at least partially coating pore walls of the second plurality of pores, wherein each of the one or more coatings comprises alucone;
a solid electrolyte interface (SEI) layer disposed between the negative electrode and the surface-modified separator; and
a liquid electrolyte system that at least partially fills the first plurality of pores and the second plurality of pores and also voids between the negative electrode, the separator, and the solid electrolyte interface (SEI) layer, wherein the liquid electrolyte system comprises:
two or more lithium salts, wherein the two or more lithium salts comprises greater than or equal to about 0.1M to less than or equal to about 0.9M of a first lithium salt and greater than or equal to about 0.1M to less than or equal to about 0.9M of a second lithium salt, wherein the first lithium salt is lithium bis(fluorosulfonyl)imide (LiN(FSO$_2$)$_2$) (LIFSI) and the second lithium salt is lithium perchlorate (LiClO$_4$); and
two or more solvents, wherein the two or more solvents comprises a first solvent and a second solvent, wherein the first solvent is fluoroethylene carbonate (FEC) and the second solvent is selected from the group consisting of: dimethyl carbonate (DMC), diethyl carbonate (DEC), ethylmethylcarbonate (EMC), 1,2-dimethoxyethane (DME), and combinations thereof.

* * * * *